July 30, 1940. T. G. HARE 2,209,457
VEHICLE POWER UNIT
Filed April 2, 1938 2 Sheets-Sheet 1

INVENTOR.
TERENCE G HARE
BY
ATTORNEY.

July 30, 1940.　　　　T. G. HARE　　　　2,209,457
VEHICLE POWER UNIT
Filed April 2, 1938　　　2 Sheets-Sheet 2

INVENTOR.
TERENCE G HARE
BY
ATTORNEY.

Patented July 30, 1940

2,209,457

UNITED STATES PATENT OFFICE 2,209,457

VEHICLE POWER UNIT

Terence G. Hare, Windsor, Ontario, Canada, assignor to T. G. Hare Company Limited, Vancouver, British Columbia, Canada, a corporation of British Columbia, Canada Application April 2, 1938, Serial No. 199,567

16 Claims. (Cl. 180—64)

This invention relates to automotive vehicles and has for its object to provide a new smoothness of operation and riding quality therefor by an improved arrangement of the power plant suspension and its connection to the body and driving wheels.

The principal object of this invention is to provide a power unit separable from the body for purposes of inspection and repair, and which is composed of driving wheels with their differentially connected axle halves inclosed by a housing to which an engine frame is fixedly connected and an engine resiliently supported from said frame entirely independently of the springs which support the vehicle body.

A further object is to provide a power unit comprising a frame and a power plant or engine resiliently mounted on said frame in such manner as to reduce the vibrations thereof to a minimum, and more particularly, to provide an engine mounting such that the engine may have substantial movement relative to the frame in a vertical direction, but in which fore and aft rotational or so-called gyroscopic movements are reduced to a minimum. Vibrations resulting from the displacement of the vertical axis of the flywheel are, therefore, reduced to a minimum.

Another object is to provide a power unit, as described, in which the engine is resiliently suspended from the frame thereof, and in which the radiator is carried directly by the engine so that there are no relative movements between the radiator and the engine. The unsprung weight is thus reduced, the destruction of radiator connections due to bending are obviated and the position of the engine fan with respect to the radiator becomes constant.

Another object is to provide a power unit, as above described, together with means for closely and non-resiliently coupling the front end thereof to the vehicle body in such manner that relative freedom of movement is obtained without the sacrifice of the necessary rigidity for resisting the torque of brake application and without danger of wheel misalignment.

A further object is to provide a resiliently mounted engine in combination with means for transmitting the engine torque through a differential gearing to the driving wheels in such manner that the differential axis remains parallel to the wheel axes, and more particularly to provide a torque resisting means which will yieldingly oppose rolling movements of the engine to the extent that they are reduced to negligible amounts insofar as their effect on the differential axis is concerned, but of sufficient magnitude as to obtain the advantages of a cushioning action.

A still further object is to provide a power unit, as described, in which the center of gravity of the engine is not far removed from a position immediately above the driving axles, and in which the propeller shaft between the engine and the axles is fore and aft of the vehicle.

Another advantage in restricting the oscillations of the engine to the vertical is that the driving wheels may momentarily delay rotation through a substantial number of degrees behind the rotation of the engine crankshaft, which in the present case is greatly increased over conventional driving arrangements, thus easing sudden clutch loadings and prolonging the life of that troublesome assembly. This is sometimes referred to as increasing "crankshaft wind-up."

Other objects and advantages will become hereinafter more fully apparent as reference is had to the accompanying drawings wherein my invention is illustrated, by way of example and in which:

Fig. 4 is a detail section showing a resilient connection such as is used at several points, the view being taken on the line 4—4 on Fig. 1.

Figure 1:
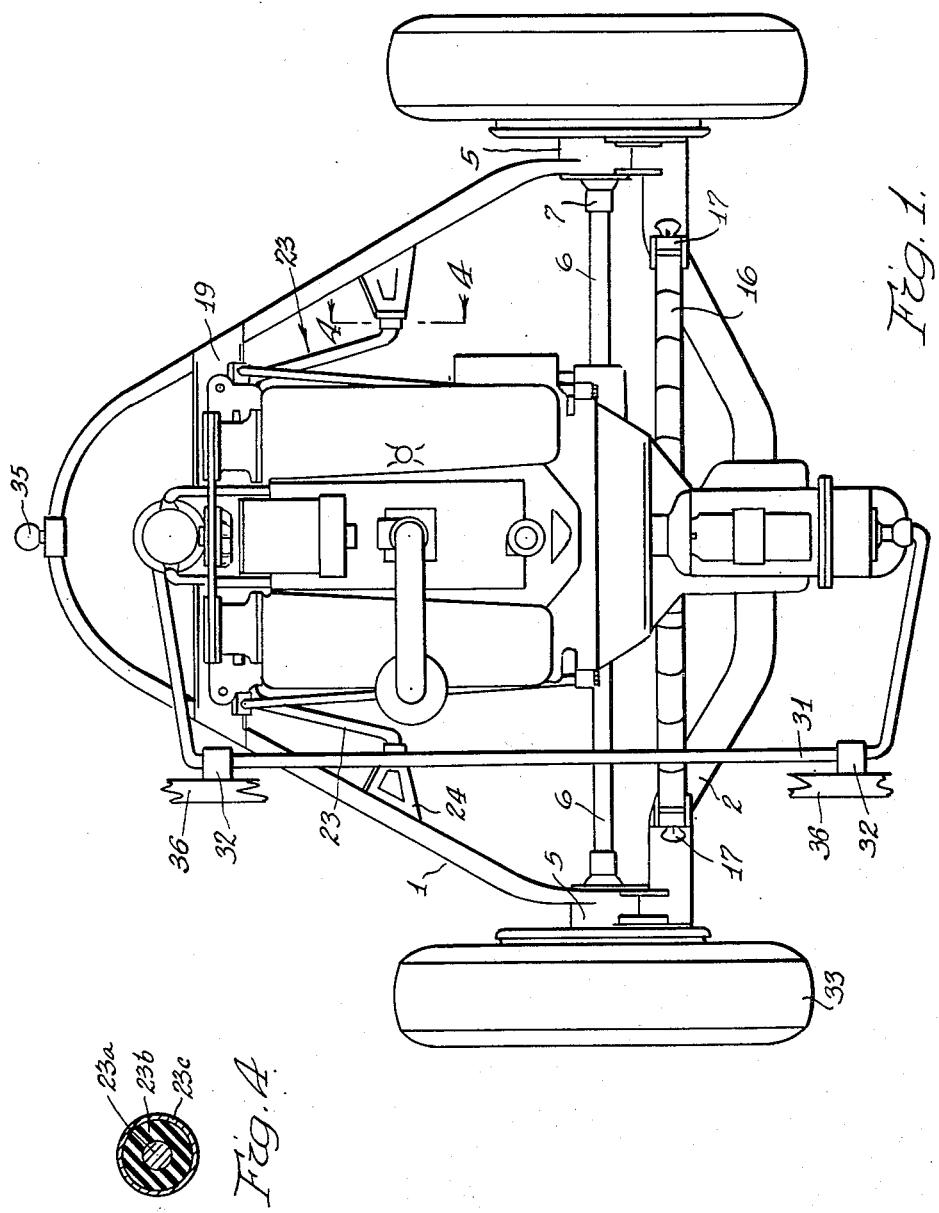
Fig. 1 is a top plan view of my improved power unit.
Figure 2:
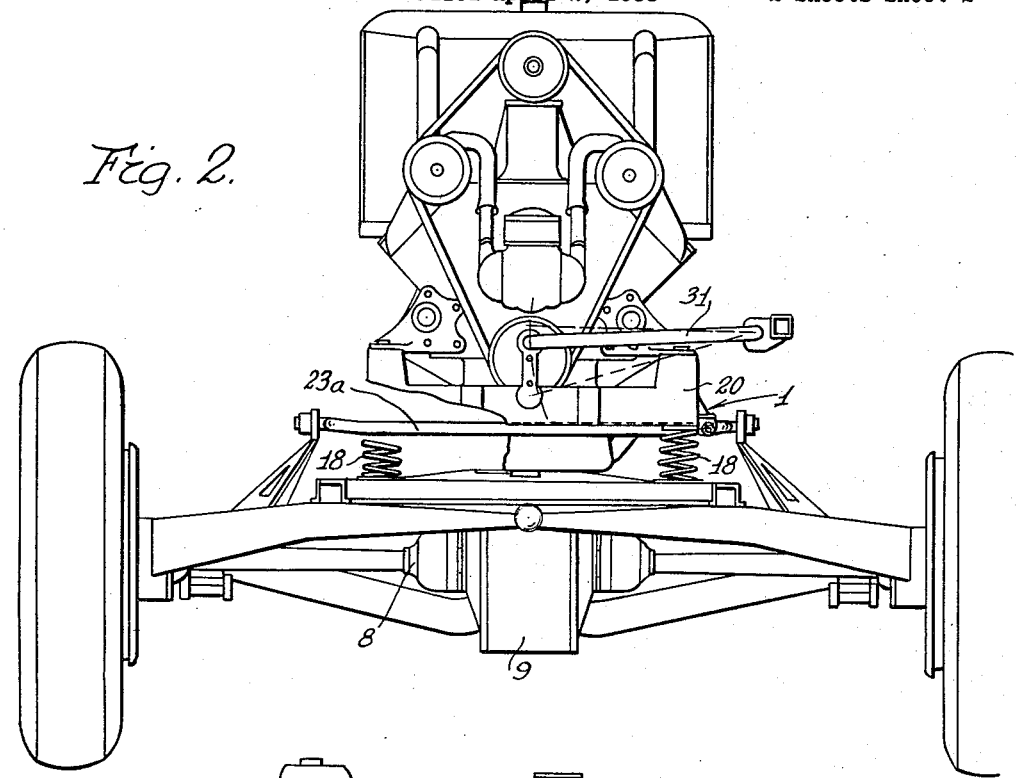
Fig. 2 is a front elevation looking rearwardly from the fixture by which the unit is attached to a vehicle body.

More particularly, the frame of my improved power unit is composed of a U or V shaped member 1 connected at its ends to a dead axle 2. Main body springs 3 are pivotally secured to the dead axle 2 by the brackets 4, and at the juncture of the dead axle and member 1 are housings 5 for journal bearings in which the driving axles 6 are rotatably mounted. The axles 6 contain universal joints 7 and 8 in their length, as is well understood, and each leads into a housing 9 which contains differential gearing (not shown) driven by a propeller shaft 10 which is contained in a housing 11. This shaft is disposed normal to the axles 6 and at an angle to the vertical and hence has an end gear 12 of bevelled type for engagement with a bevel gear 13 secured on the final drive shaft of the engine transmission which is contained in the housing 14. An engine 15 is rigidly secured to the housing 14 and also rigidly connected to the differential housing 9 for movements therewith.

The engine 15, transmission and housing 14, propeller shaft 10 and housing 11, and differential housing 9 are all supported as a unitary assembly by a resilient means 16, herein illustrated as a transverse leaf spring connected at its ends 17 to the dead axle 2, and by additional resilient means 18, herein illustrated as two spaced coil springs, to a bridge or cross member 19 between the branches of the V member 1. The engine is provided with a supporting plate or bracket 20 to which it is rigidly secured and it is this bracket which rests directly upon the springs 18, which accept the weight of the front end of the engine. Additional springs 21 are placed in opposition to the springs 18 in order to oppose elevation of either side of the motor in resilient compression. Brace bars 22 connect the bracket 20 to points on the sides of the engine remote therefrom.

In order to oppose the tendency of the engine in its transverse rotational movements, I provide two torque arms 23 each hingedly anchored at one end to the base bracket 20, and each hingedly anchored at its other end to a bracket 24 fixed to the frame member 1. Preferably, these two arms 23 are integrally connected by a rod portion 23a so that these torque resistors are actually made as a single spread U member with bearings at each end and near the middle thereof. These hinge connections may be of the conventional bearing type, but are preferably of the elastic type illustrated in Fig. 4, wherein the center shaft 23a is equivalent to an end of an arm 23 and is surface bonded to a cylinder of rubber 23b contained in an outer shell 23c, which is fixedly mounted in the bracket 24 or bracket 20, as the case may be.

Extending forwardly of the front end of the engine is a pin 25 and extending rearwardly from the outer end of the transmission housing is a second pin 26, the axes of these pins being preferably aligned and hence at or approximately at the same distance from the crankshaft axis and the center of gravity of the engine. The pins 25 and 26 terminate in balls 27 which are preferably enveloped in rubber 28 housed by the lower end of a link 29. The other end of each link 29 is similarly built and each houses a pin 30 formed similarly to the pins 25 and 26. The pins 30 are fixed in the outer ends of a bent torque arm 31 which is journalled intermediate its length in bearings 32 secured to a portion 36 of the vehicle body to which the frame and springs 3 are attached. Instead of bearings 32 the attachment of the torque arm 31 to the body may be made by an elastic connection such as has been described with reference to Fig. 4.

The effect of the torque resisting arm 31 is to oppose rotational movements of the engine through an arc longitudinally thereof and to substantially restrict the engine to vertical movements relative to the frame.

Figure 3:
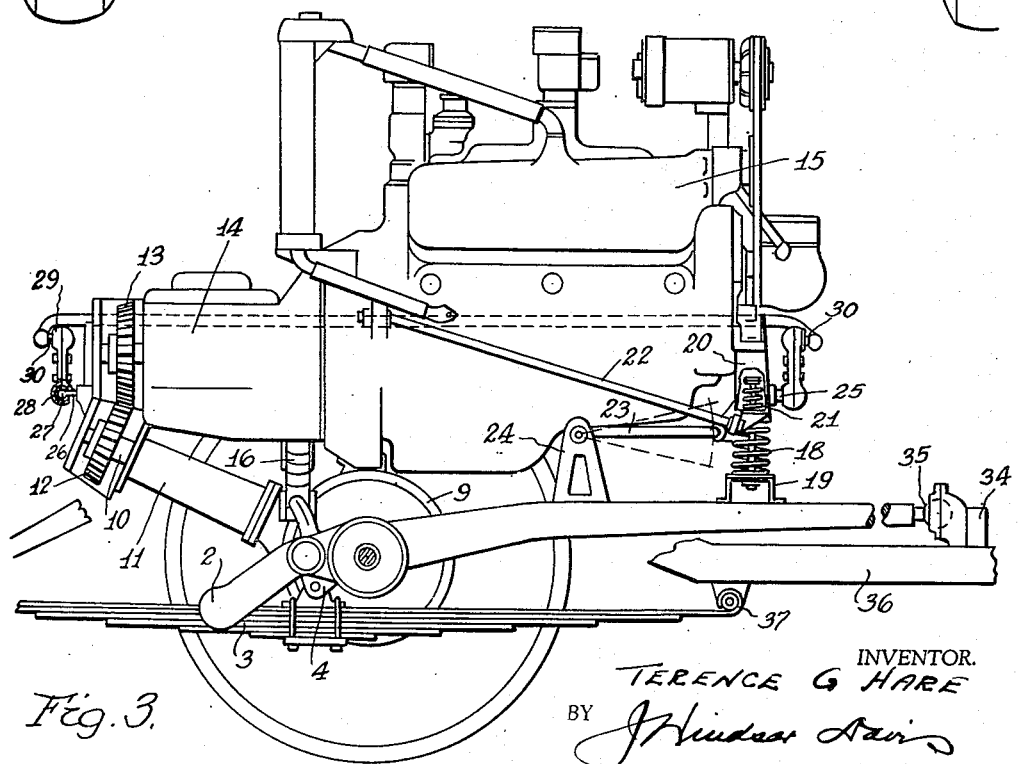
Fig. 3 is a side elevation.

The axles 6 are connected to main vehicle wheels 33 which support one end of the power unit, the other end being supported by the attachment of the ball joint member 35, fixed on the member 1, to a main cross member 34 of the vehicle body, a fragment of the body being illustrated at 36, Fig. 3, where the attachment of the main spring 3 to the body is also illustrated at 37.

It will be seen that driving axle angularities are not subject to load variations within the vehicle. In other words, if the vehicle body 36 is depressed or elevated from the position illustrated, the engine and driving axles are not noticeably affected as to angularity relative to the ground.

What I claim is:

1. In a vehicle, an engine supporting structure independent of and adapted to be connected to the main vehicle structure, an engine, springs supporting said engine from said supporting structure, and means connected to said engine at widely separated points and to an anchorage foreign to said engine supporting springs substantially restricting vibrational movement of said engine with respect to said supporting structure to a vertical direction.

2. In a vehicle, a main vehicle structure, an engine supporting structure connected to said main vehicle structure, an engine resiliently supported in said supporting structure, a power take off means at one end of said engine thereby subjecting said engine to tendencies to rotate through an arc longitudinally thereof, and means connected to said engine at widely separated points and to an anchorage foreign to the resilient supports of the engine causing said engine to oscillate vertically against said tendencies to rotate.

3. In a vehicle, an engine supporting structure, an engine resiliently supported in said structure, a power take off means at one end of said engine thereby subjecting said engine to tendencies to rotate through an arc longitudinally thereof, and a motion transmitting means pivotally connected to widely separated points longitudinally of said engine and to an anchorage foreign to the resilient supports of said engine whereby all tendencies of said engine to rotate through a longitudinal arc are converted into vertical movements with respect to said supporting structure.

4. In a vehicle, an engine supporting structure, an engine resiliently supported in said structure, a power take off means at one end of said engine thereby subjecting said engine to tendencies to rotate through an arc longitudinally thereof, and a rigid U-shaped member pivotally connected at each end to said engine and pivotally supported intermediate its ends in a journal supported independently of the resilient supports of said engine whereby all tendencies of said engine to rotate through a longitudinal arc are converted into vertical movements with respect to said supporting structure.

5. In a vehicle, an engine supporting structure, an engine resiliently supported in said structure, a power take off means at one end of said engine thereby subjecting said engine to tendencies to rotate through an arc longitudinally thereof, vertically disposed links pivotally connected one at each end of said engine and at substantially the same vertical position with respect to the crankshaft of said engine, and a rigid bent member pivotally connected at each end to one of said links and pivotally supported intermediate its ends in a journal supported independently of the resilient supports of said engine whereby all tendencies of said engine to rotate through a longitudinal arc are converted into vertical movements with respect to said supporting structure.

6. In a vehicle, an engine supporting structure, an engine resiliently supported by said structure for movements with respect thereto, said engine having tendencies to rotate through an arc transversely of its length due to the rotations of the crankshaft thereof, and having tendencies to rotate through an arc longitudinally thereof due to taking the power from one end thereof, and means supported outwardly of the resilient supports therefor and connected to the engine remote from its resilient supports for converting substantially all of said tendencies into bodily vertical movements of said engine with respect to said structure.

7. In a vehicle, an engine supporting structure, an engine resiliently supported by said structure for movements with respect thereto, said engine having tendencies to rotate through an arc transversely of its length and to the rotations of the crankshaft thereof and having tendencies to rotate through an arc longitudinally thereof, due to taking the power from one end thereof, torque resisting arms pivotally connected at one end to said supporting structure and at the other end to opposite sides of said engine opposing transverse rotational movements, and torque resisting arms pivotally connected at one end to a point exteriorly of the resilient supports of said engine and at the other end to opposite ends of said engine opposing rotational movements of said engine through a longitudinal arc.

8. The combination as set forth in claim 7 wherein the pivotal connection of the first mentioned torque resisting means to said structure comprises elastic material.

9. The combination as set forth in claim 7 wherein the pivotal connection of said last mentioned torque resisting means to said engine comprises elastic material.

10. The combination as set forth in claim 7 wherein all pivotal connections of both of said torque resisting means comprises elastic material.

11. In a vehicle, an engine supporting structure, an engine resiliently supported near each end thereof from said structure, and torque resisting means substantially restricting all movements of said engine to bodily vertical movements, said means comprising a rigid member pivotally connected to said engine at separated points and to an anchorage foreign to the resilient support of the engine.

12. In a vehicle, an engine supporting structure, springs carried by said structure, an engine, engine transmission, propeller drive shaft housing and differential housing having differential gearing rotatable therein all rigidly secured together and jointly supported by said springs, and all subject to tendencies to rotate through vertical arcs longitudinally of said engine, during operation, and torque resisting means opposing such tendencies and converting such tendencies into vertical movements whereby the flywheel of said engine rotates in a constant plane relative to the ground and whereby the vertical displacements of said transmission housing are reduced.

13. In a vehicle, an engine supporting structure, springs carried by said structure, an engine, engine transmission, propeller drive shaft housing and differential housing having differential gearing rotatable therein all rigidly secured together and jointly supported by said springs and all subject to tendencies to rotate through vertical arcs longitudinally of said engine, and to tendencies to rotate through arcs transversely of the engine during operation, and torque resisting means opposing all such tendencies and converting such tendencies into vertical movements whereby the flywheel of said engine rotates in a constant plane relative to the ground and whereby the axis of said differential housing is in substantially constant relative position with respect to the ground and subject to reduced vertical movements.

14. In a vehicle having a body, a power unit comprising a frame having a pivot member at one end thereof for attachment to the body, body spring hangers on said frame remote from said pivot member, main body springs between said hangers and said body, one of the transverse members of said frame comprising a dead axle and having aligned journal bearings for the reception of driving axles, engine supporting springs on said frame, an engine supported directly by said springs, and torque resisting means substantially restricting all movements of said engine relative to said frame to a vertical direction.

15. In a power unit comprising a frame having a pivotal member at one end thereof for attachment to the body of a vehicle, and having opposite, aligned journal bearings remote from said pivotal member for the reception of driving axles, springs carried by said frame, an engine, an engine transmission, a propeller shaft housing and a differential housing fixedly secured together and supported from said springs as a single assembly, and torque resisting means substantially restricting all movements of said assembly with respect to said frame to a vertical direction.

16. In a power unit comprising a frame having a pivotal member at one end thereof for attachment to the body of a vehicle, and having opposite, aligned journal bearings remote from said pivotal member for the reception of driving axles, springs carried by said frame, an engine, an engine transmission, a propeller shaft housing and a differential housing fixedly secured together and supported from said springs as a single assembly, the differential housing residing directly below one end of said engine and fixedly secured directly thereto, said propeller shaft housing extending fore and aft of the unit and rigidly connecting said transmission housing and said differential housing, and torque resisting means substantially restricting all movements of said engine and said housings to a vertical direction.

TERENCE G. HARE.